(12) United States Patent
Bedard

(10) Patent No.: US 9,610,987 B2
(45) Date of Patent: Apr. 4, 2017

(54) ICE SCRATCHER FOR A SNOWMOBILE

(71) Applicant: BOMBARDIER RECREATIONAL PRODUCTS INC., Valcourt (CA)

(72) Inventor: Yvon Bedard, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/448,397

(22) Filed: Jul. 31, 2014

(65) Prior Publication Data
US 2015/0034403 A1    Feb. 5, 2015

Related U.S. Application Data

(60) Provisional application No. 61/860,851, filed on Jul. 31, 2013.

(51) Int. Cl.
*B62D 55/092* (2006.01)
*B62M 29/00* (2006.01)
*B62M 27/02* (2006.01)
*B62D 55/07* (2006.01)

(52) U.S. Cl.
CPC .......... *B62D 55/092* (2013.01); *B62M 27/02* (2013.01); *B62M 29/00* (2013.01); *B62D 55/07* (2013.01); *B62M 2027/027* (2013.01)

(58) Field of Classification Search
CPC ...... B62D 55/07; B62D 55/092; B62B 17/02; B62M 27/02; B62M 29/00; B62M 2027/027
USPC .......................................... 180/190; 280/809
See application file for complete search history.

(56) References Cited

U.S. PATENT DOCUMENTS

| | | |
|---|---|---|
| 3,252,524 A | 5/1966 | Van Der Lely |
| 4,076,089 A | 2/1978 | Sanders |
| 4,679,959 A | 7/1987 | Cavallaro |
| 5,277,266 A * | 1/1994 | Robinson ............... B60K 11/02 180/190 |
| 6,026,600 A | 2/2000 | Lela |
| 7,527,116 B2 | 5/2009 | Aoshima |
| 7,533,749 B1 | 5/2009 | Sampson |
| 7,918,298 B2 | 4/2011 | Cook |

(Continued)

OTHER PUBLICATIONS

International Search Report of PCT/US2012/062668, Feb. 25, 2013, Lee W. Young.

*Primary Examiner* — Joseph Rocca
*Assistant Examiner* — Felicia L Brittman
(74) *Attorney, Agent, or Firm* — BCF LLP

(57) ABSTRACT

An ice scratcher for attachment to a snowmobile includes first and second ice scratcher end portions opposite to each other, an elongate member connected to the second ice scratcher end portion, and a spring connecting the first ice scratcher end portion to the elongate member. The spring has a plurality of coils defining a coil radius. The spring is movable between an unbent configuration, wherein a centerline passing through respective centers of each coil of the plurality of coils defines a coil axis, and a bent configuration, wherein at least a portion of the centerline is displaced from the coil axis. At least a portion of the first ice scratcher end portion is radially spaced from the coil axis by a distance less than the coil radius and adapted for attachment to the snowmobile. Ice scratcher assemblies, kits and snowmobiles having the ice scratcher are also disclosed.

24 Claims, 17 Drawing Sheets

(56) References Cited

U.S. PATENT DOCUMENTS

| | | | | |
|---|---|---|---|---|
| 8,646,559 B2* | 2/2014 | Beaudoin | ............ | B62D 55/092 |
| | | | | 180/190 |
| 2008/0290728 A1 | 11/2008 | Cook | | |
| 2014/0299399 A1* | 10/2014 | Vezina | ................... | B60K 11/02 |
| | | | | 180/190 |

* cited by examiner

ICE SCRATCHER FOR A SNOWMOBILE

CROSS-REFERENCE

The present application claims priority to U.S. Provisional Patent Application No. 61/860,851 filed on Jul. 31, 2013, the entirety of which is incorporated herein by reference.

TECHNICAL FIELD

The present technology relates to ice scratchers for snowmobiles.

BACKGROUND

During operation, the track and slide rails of a snowmobile are cooled and lubricated by sprays of loose snow that are generated during the normal operation of the snowmobile on loose snow.

In snowmobiles having liquid cooled engines, heat exchangers are often provided under the tunnel to take advantage of these sprays of loose snow. The sprayed snow makes contact with the heat exchanger and absorbs the heat from the coolant flowing in the heat exchangers. The sprayed snow also provides lubrication between the track and slide rails to reduce friction therebetween.

However, when a snowmobile operates on hard packed snow or an icy surface, there may be no spray at all, or if generated, the sprays are much smaller than those generated on loose snow. As a result, the track and slide rails are not cooled as efficiently as on loose snow. The reduction in snow being sprayed also increases friction between the track and slide rails which contributes to further heating of the track and slide rails and could even lead to premature wear of these components. In the case of snowmobiles having liquid cooled engines with heat exchangers provided under the tunnel, the absence of snow sprays also reduces the cooling efficiency of the coolant flowing in the heat exchanger as the heat transfer from the coolant occurs mostly via the cold air.

Therefore, there is a need for a device to generate a spray of ice or snow that can be easily deployed when needed, durable and effective with the snowmobile moving forwardly or rearwardly.

SUMMARY

One object of the present is to ameliorate at least some of the inconveniences of the prior art.

According to one aspect of the present technology, there is provided an ice scratcher for attachment to a snowmobile having a first ice scratcher end portion adapted for attachment to the snowmobile and a second ice scratcher end portion opposite the first ice scratcher end portion. An elongate member is connected to the second ice scratcher end portion. A spring connects the first ice scratcher end portion to the elongate member. The spring has a plurality of coils defining a coil radius. The spring is movable between an unbent configuration wherein a centerline passing through respective centers of each coil of the plurality of coils defines a coil axis and a bent configuration wherein at least a portion of the centerline is displaced from the unbent configuration coil axis. At least a portion of the first ice scratcher end portion is radially spaced from the unbent configuration coil axis by a distance less than the coil radius and being adapted for attachment to the snowmobile.

In some implementations of the present technology, a portion of the first ice scratcher end is radially spaced from the unbent configuration coil axis by a distance greater than the coil radius.

In some implementations of the present technology, in the unbent configuration, the second ice scratcher end portion extends downwardly and forwardly from the elongate member when the ice scratcher is attached to the snowmobile.

In some implementations of the present technology, in the unbent configuration, the elongate member is disposed forwardly of the unbent configuration coil axis when the ice scratcher is attached to the snowmobile.

In some implementations of the present technology, in the unbent configuration, an upper portion of the elongate member extends away from the spring in a direction parallel to the unbent configuration coil axis.

In some implementations of the present technology, the spring is wound in a direction such that when the ice scratcher is attached to the snowmobile, a rearward displacement of the elongate member winds the spring tighter.

In some implementations of the present technology, a length of the spring in a direction parallel to the unbent configuration coil axis is smaller than a length of the elongate member.

In some implementations of the present technology, the elongate member is integrally formed with the spring.

In some implementations of the present technology, the second ice scratcher end portion is integrally formed with the elongate member.

In some implementations of the present technology, a wear-resistant tip is connected to the second ice scratcher end portion.

In some implementations of the present technology, an ice scratcher assembly includes an ice scratcher having one or more of the above aspects, and a mounting bracket adapted for attachment to the snowmobile. The first ice scratcher end portion is fixed to the mounting bracket.

In some implementations of the present technology, the first ice scratcher end is detachably fastened to the mounting bracket.

In some implementations of the present technology, the mounting bracket has a first aperture, a center of the first aperture being radially spaced from the unbent configuration coil axis by a distance less than the coil radius. A first threaded fastener is inserted through the first aperture and fastens a first portion of the first ice scratcher end portion to the mounting bracket.

In some implementations of the present technology, the mounting bracket has a groove, the first portion of the first ice scratcher end portion being at least in part received in the groove.

In some implementations of the present technology, the mounting bracket has a second aperture, a center of the second aperture being radially spaced from the unbent configuration coil axis by a distance greater than the coil radius. A second threaded fastener is inserted through the second aperture and fastens a second portion of the first ice scratcher end portion to the mounting bracket.

In some implementations of the present technology, a hook is adapted for attachment to the snowmobile. The ice scratcher has a stowed configuration when attached to the snowmobile wherein at least one of the elongate member and the second ice scratcher end portion is supported by the hook.

In some implementations of the present technology, a snowmobile has a frame including a tunnel, a motor connected to the frame, and a suspension assembly connected to the frame. An endless track is connected to the frame via the suspension assembly and operatively connected to the motor. The snowmobile includes an ice scratcher having one or more of the above described aspect. The first ice scratcher end portion is connected to at least one of the frame and the suspension assembly. The unbent configuration coil axis extends laterally. The ice scratcher has an operative configuration wherein the second ice scratcher end portion is in contact with a surface on which the snowmobile operates at a position laterally outward of the track.

In some implementations of the present technology, the suspension assembly includes a slide rail contacting an inner surface of the track and the ice scratcher is attached to the slide rail.

In some implementations of the present technology, the ice scratcher has a stowed configuration wherein the second ice scratcher end portion is spaced from the surface on which the snowmobile operates.

In some implementations of the present technology, the second ice scratcher end portion is disposed rearward of the spring in the stowed configuration.

In some implementations of the present technology, when viewed from a side of the snowmobile, the plurality of coils is wound in one of a clockwise and a counter-clockwise direction with the ice scratcher in the unbent configuration, and the second ice scratcher end portion is displaced in the one of the clockwise and the counter-clockwise directions to move the ice scratcher from the operative configuration to the stowed configuration.

In some implementations of the present technology, the suspension assembly includes a slide rail contacting an inner surface of the track. The snowmobile has a hook attached to the slide rail. The hook extends laterally outwardly from the slide rail and selectively supports at least one of the elongate member and the second ice scratcher end portion when the ice scratcher is in a stowed configuration.

In some implementations of the present technology, an ice scratcher kit provides an ice scratcher assembly on a snowmobile. The kit includes an ice scratcher having one or more of the above aspects, a mounting bracket adapted to be fastened to the snowmobile, and at least one fastener adapted to fasten the ice scratcher to the mounting bracket.

In some implementations of the present technology, the at least one fastener is further adapted to fasten the mounting bracket to the snowmobile.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the ice scratcher for example, should be understood as they would be understood when these components or sub-assemblies are mounted to the vehicle.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
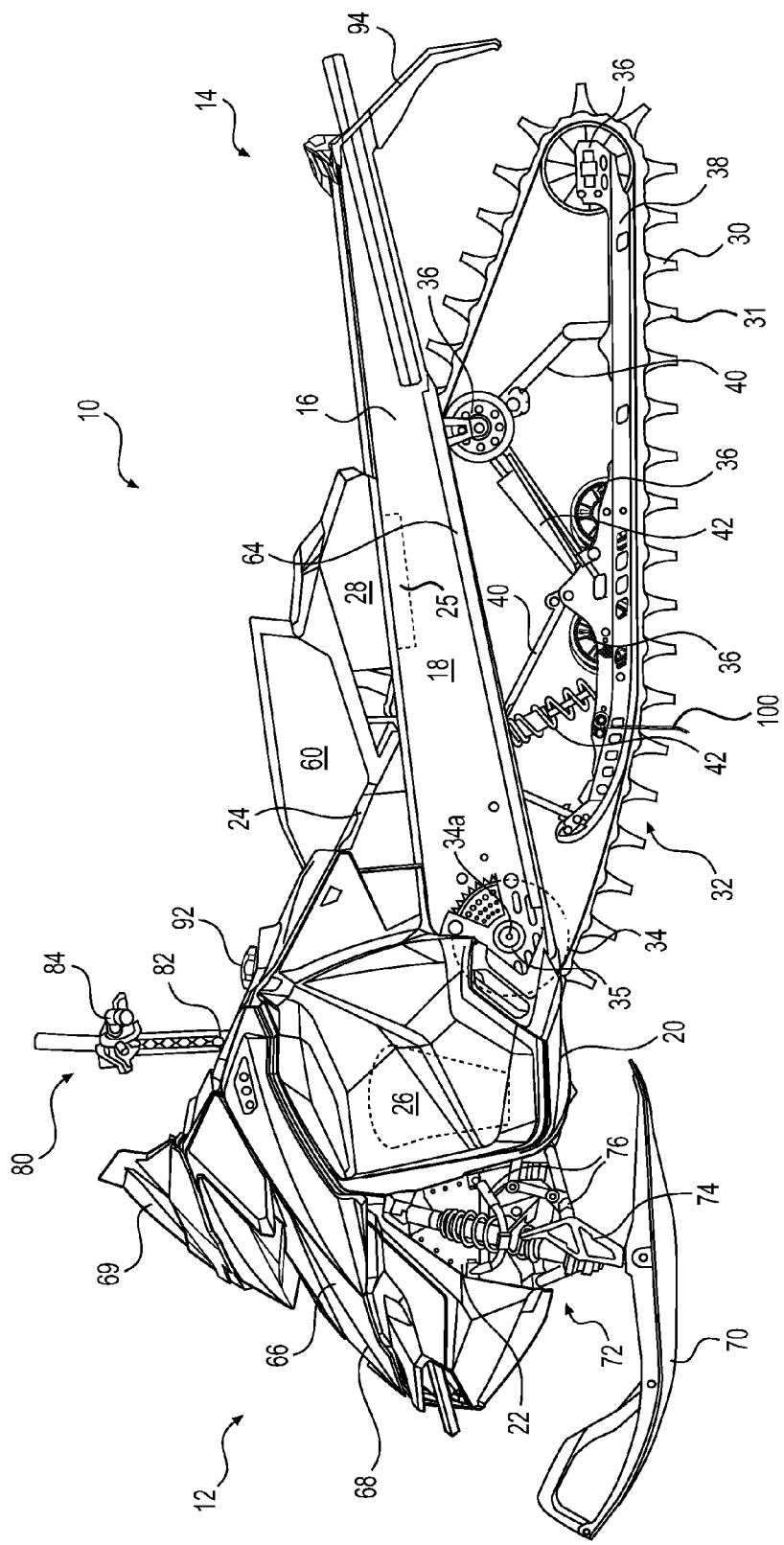
FIG. 1 is a left side elevation view of a snowmobile with a left ice scratcher attached to a left slide rail and in an unbent configuration.
Figure 2:
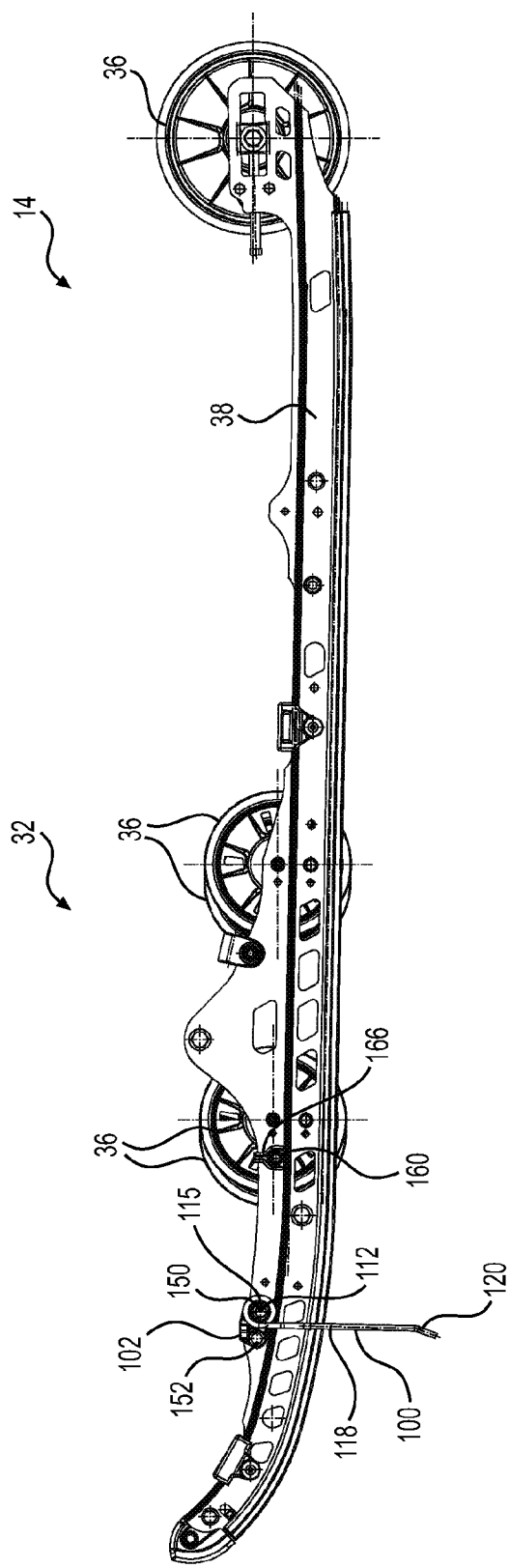
FIG. 2 is a left side elevation view of the left ice scratcher and slide rail assembly of the snowmobile of FIG. 1.
Figure 3:
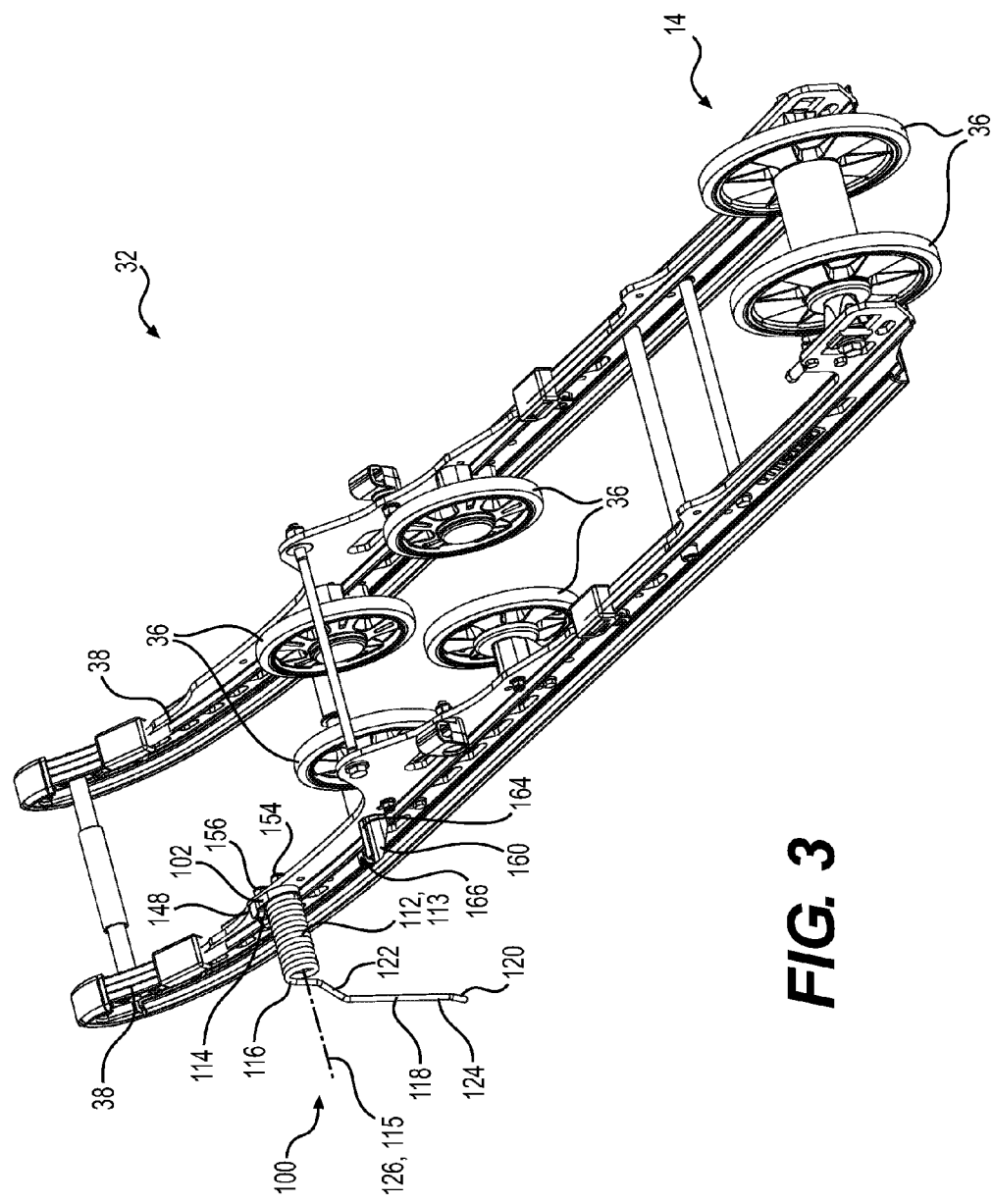
FIG. 3 is a perspective view, taken from a top, rear and left side, of the ice scratcher and slide rail assembly of FIG. 2.

Referring to FIG. 1, a snowmobile 10 will be described. Although a snowmobile is presented herein. It is contemplated that aspects of the present could be applied to other types of tracked vehicles operating on snow or ice, such as all-terrain vehicles provided with track kits and snow groomers.

The snowmobile 10 includes a forward end 12 and a rearward end 14 which are defined consistently with a travel direction of the vehicle 10. The snowmobile 10 includes a vehicle body in the form of a frame or chassis 16 which includes a rear tunnel 18, an engine support structure 20, a front suspension module 22 and an upper structure 24. The tunnel 18 defines a longitudinal centerplane 13 (longitudinally disposed vertical plane, FIG. 4) of the snowmobile 10.

A motor 26 (schematically illustrated in FIG. 1), which in the illustrated implementation is an internal combustion engine, is carried in an engine compartment defined by the engine cradle portion 20 of the frame 16. A fuel tank 28, supported above the tunnel 18, supplies fuel to the engine 26 for its operation. Coolant used to cool the engine 26 is circulated through heat exchangers 25 (schematically shown) to be cooled. The heat exchangers 25 are mounted under the tunnel 18.

An endless drive track 30 is positioned at the rear end 14 of the snowmobile 10. The drive track 30 is disposed generally under the tunnel 18, and operatively connected to the engine 26 through a belt transmission system (not shown) and a reduction drive. The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30.

The rear suspension assembly 32 includes a drive sprocket 34, one or more idler wheels 36 and a pair of slide rails 38 in sliding contact with the endless drive track 30. The drive sprocket 34 is mounted on a drive axle 35 and defines a sprocket axis 34a. The slide rails 38 are attached to the tunnel 18 by front and rear suspension arms 40 and one or more shock absorbers 42 which include a coil spring (not indicated) surrounding the individual shock absorbers 42. It is contemplated that the snowmobile 10 could be provided with a different implementation of a rear suspension assembly 32 than the one shown herein.

As can be seen in FIG. 1, an ice scratcher 100 is connected to the left slide rail 38 of the snowmobile 10. An ice scratcher 100 could similarly be connected to the right side rail 54. The lower end of the ice scratcher 100 scratches the surface of the ice or the snow on which the snowmobile 10 operates to create sprays of ice or snow. Part of the sprayed ice or snow is deposited on the inner surface of the track 30 and thereby lubricates the interface between the slide rails 38 and the inner surface of the track 30. The sprayed ice or snow also cools the track 30 and elements of the suspension assembly 32. Part of the sprayed ice or snow is also flung by the track 30 onto the heat exchangers 25 to assist in cooling the engine coolant. As should be understood from the above description, although they are called ice scratchers 100, the ice scratchers 100 can be used to scratch both icy and snowy surfaces. The ice scratcher 100 will be described in more detail below.

A straddle-type seat 60 is positioned atop the fuel tank 28. A fuel tank filler opening covered by a cap 92 is disposed on the upper surface of the fuel tank 28 in front of the seat 60. It is contemplated that the fuel tank filler opening 92 could be disposed elsewhere on the fuel tank 28. The seat 60 is adapted to accommodate a driver of the snowmobile 10. The seat 60 can also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also be decorated to make the snowmobile 10 more aesthetically pleasing. Typically, the fairings 66 include a hood 68 and one or more side panels which can be opened to allow access to the engine 26 and the belt transmission system when this is required, for example, for inspection or maintenance of the engine 26 and/or the transmission system. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine support structure 24. The front suspension assembly 72 includes ski legs 74, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a finger-actuated throttle lever is mounted to the right side of the handlebar 84. Other types of throttle operators, such as a thumb-actuated throttle lever and a twist grip, are also contemplated. A brake actuator (not indicated), in the form of a hand brake lever, is provided on the left side of the handlebar 84 for braking the snowmobile 10 in a known manner. The windshield 69 may be connected directly to the handlebar 84.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The left ice scratcher 100 and its assembly on to the snowmobile 10 will now be described with reference to FIGS. 2 to 14.

With reference to FIGS. 1 to 5 and 11 to 13, the left ice scratcher 100 is connected to the left side of the left slide rail 38 by a left mounting bracket 102. The left ice scratcher 100 extends leftwardly from the left mounting bracket 102. The ice scratcher 100 and the mounting bracket 102 together form an ice scratcher assembly.

It is contemplated that a right ice scratcher 100 could be similarly connected to the right side of the right slide rail 38 by a right mounting bracket 102 so as to extend rightwardly therefrom. The right ice scratcher 100 would be a mirror image of the left ice scratcher 100 and the right mounting bracket 102 would be a mirror image of the left mounting bracket 100. It is contemplated that the ice scratcher 100 could be connected to other portions of the tunnel 18, to the suspension assembly 32 or elsewhere on the snowmobile 10. It is also contemplated that features of the mounting bracket 102 could be integrally formed with the slide rail 38.

Figure 5:
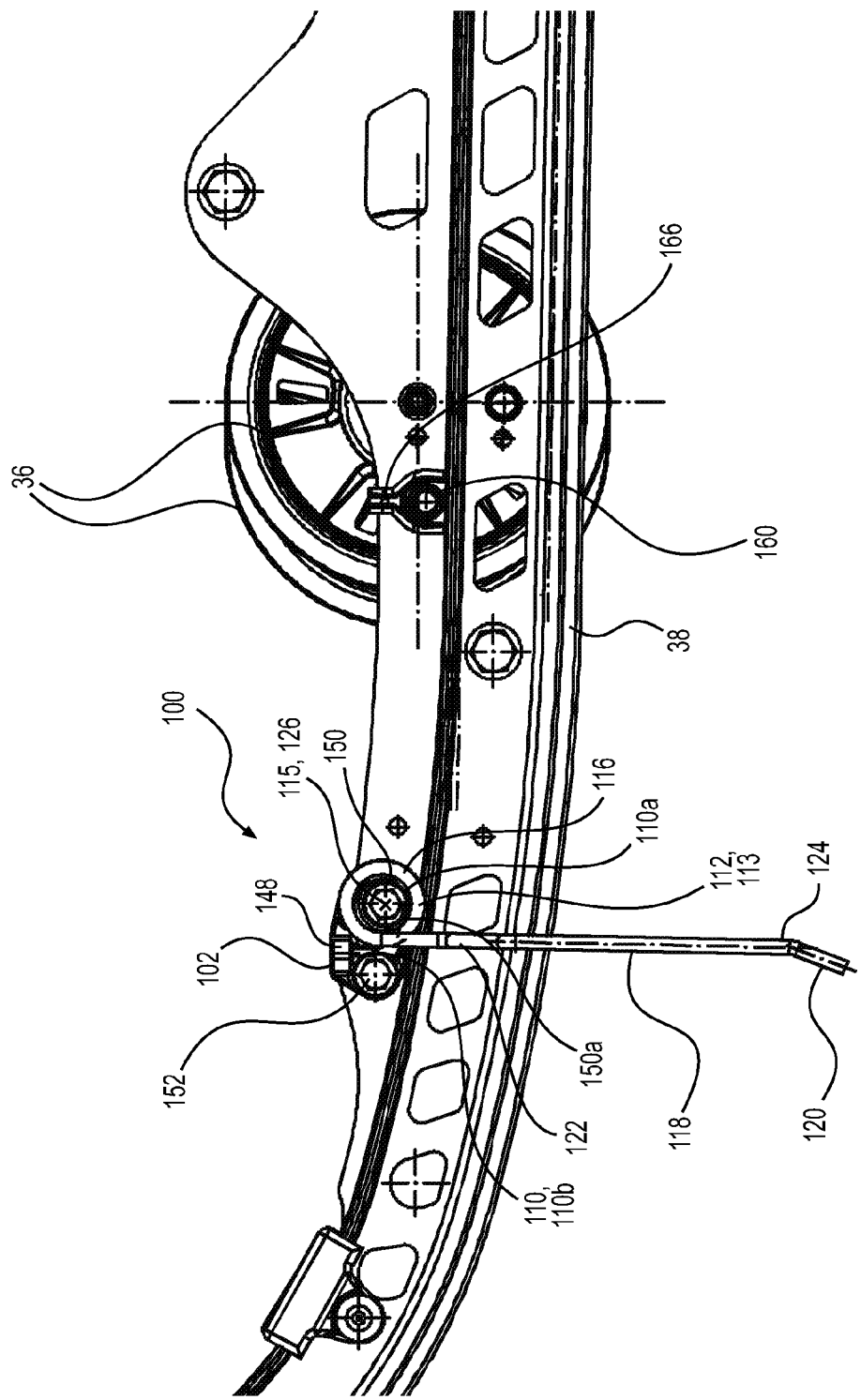
FIG. 5 is a close-up left side elevation view of a portion of the slide rail of FIG. 2 having the ice scratcher mounted thereto by a mounting bracket.
Figure 6:
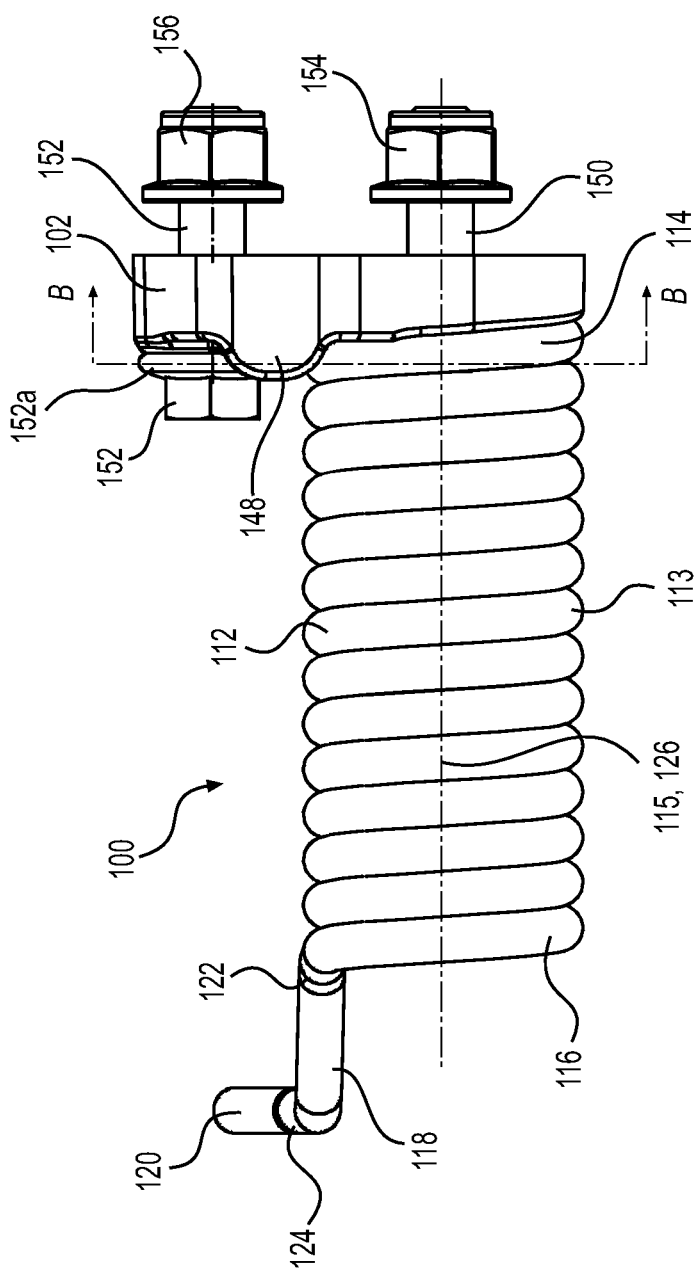
FIG. 6 is a top plan view of the mounting bracket and attached ice scratcher of FIG. 5 with the slide rail removed for clarity.
Figure 7A:
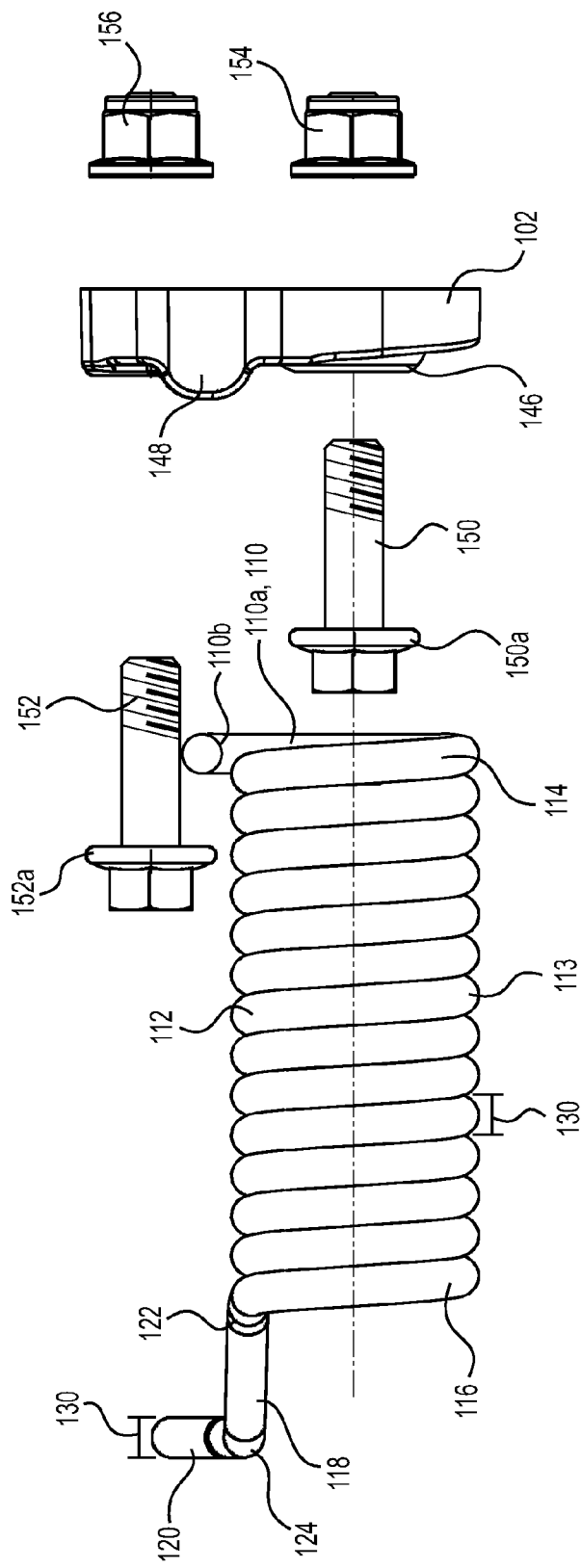
FIG. 7A is an exploded top plan view of the mounting bracket and ice scratcher of FIG. 6.
Figure 7B:
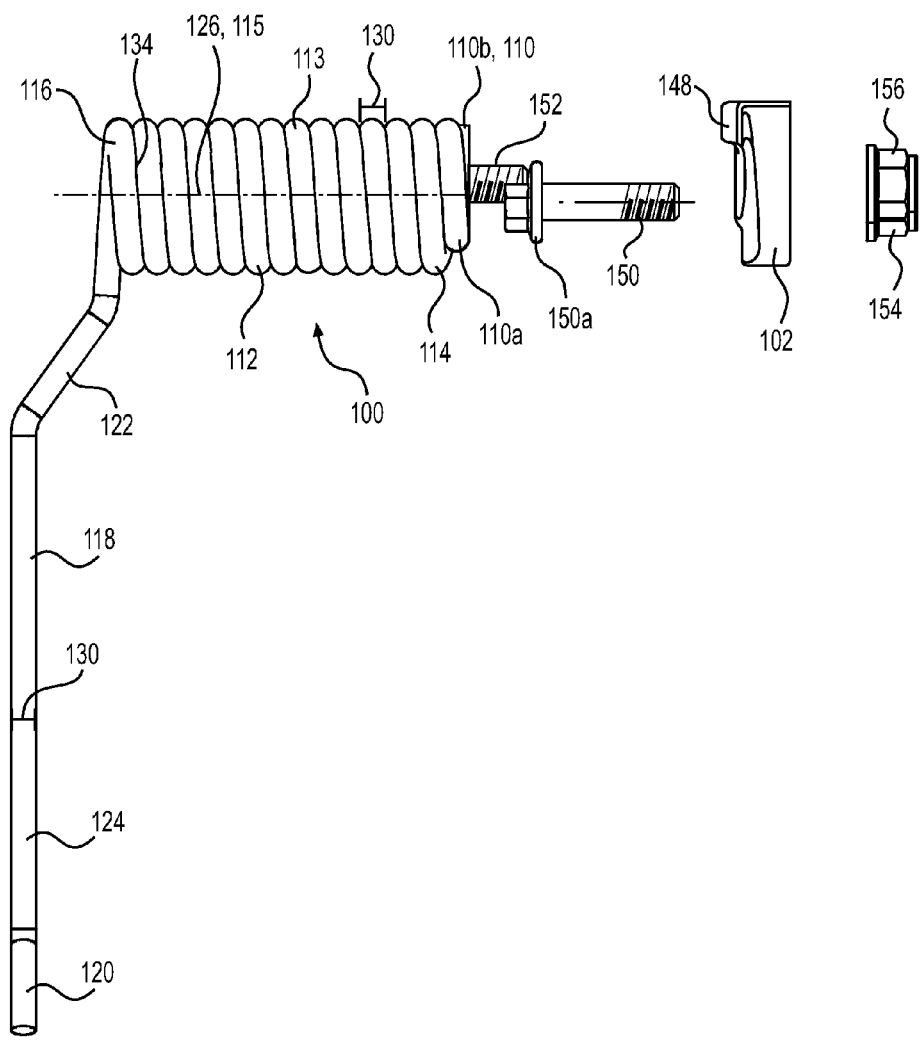
FIG. 7B is an exploded rear elevation view of the mounting bracket and ice scratcher of FIG. 6.
Figure 7C:
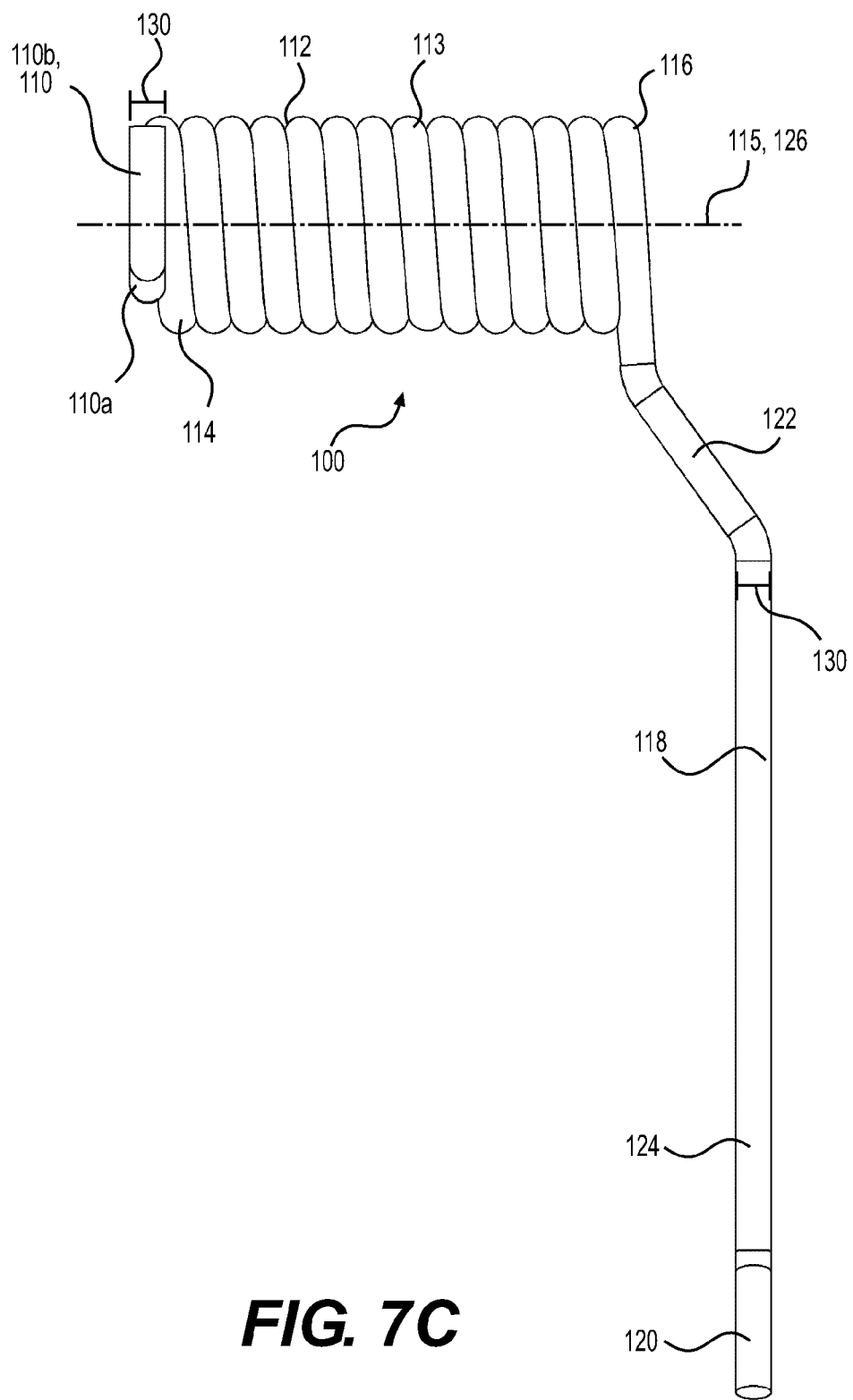
FIG. 7C is a front elevation view of the ice scratcher of FIG. 6.
Figure 7D:
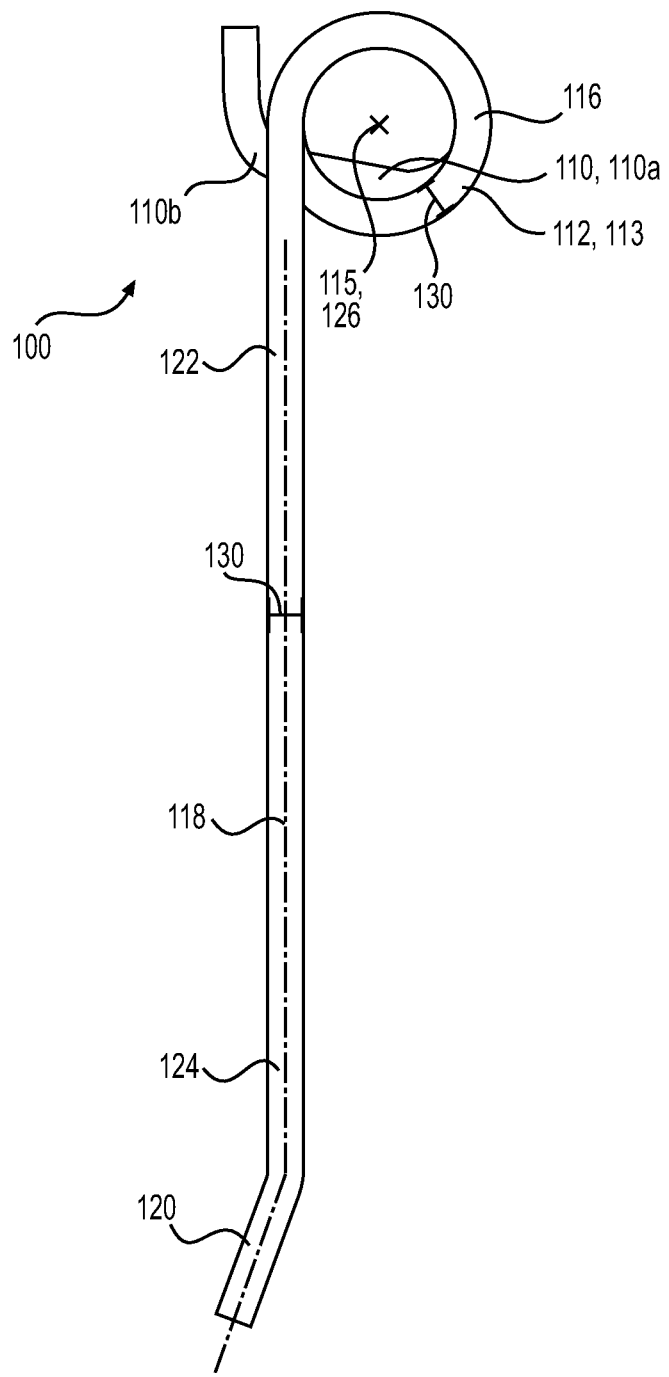
FIG. 7D is a left side elevation view of the ice scratcher of FIG. 6.
Figure 9:
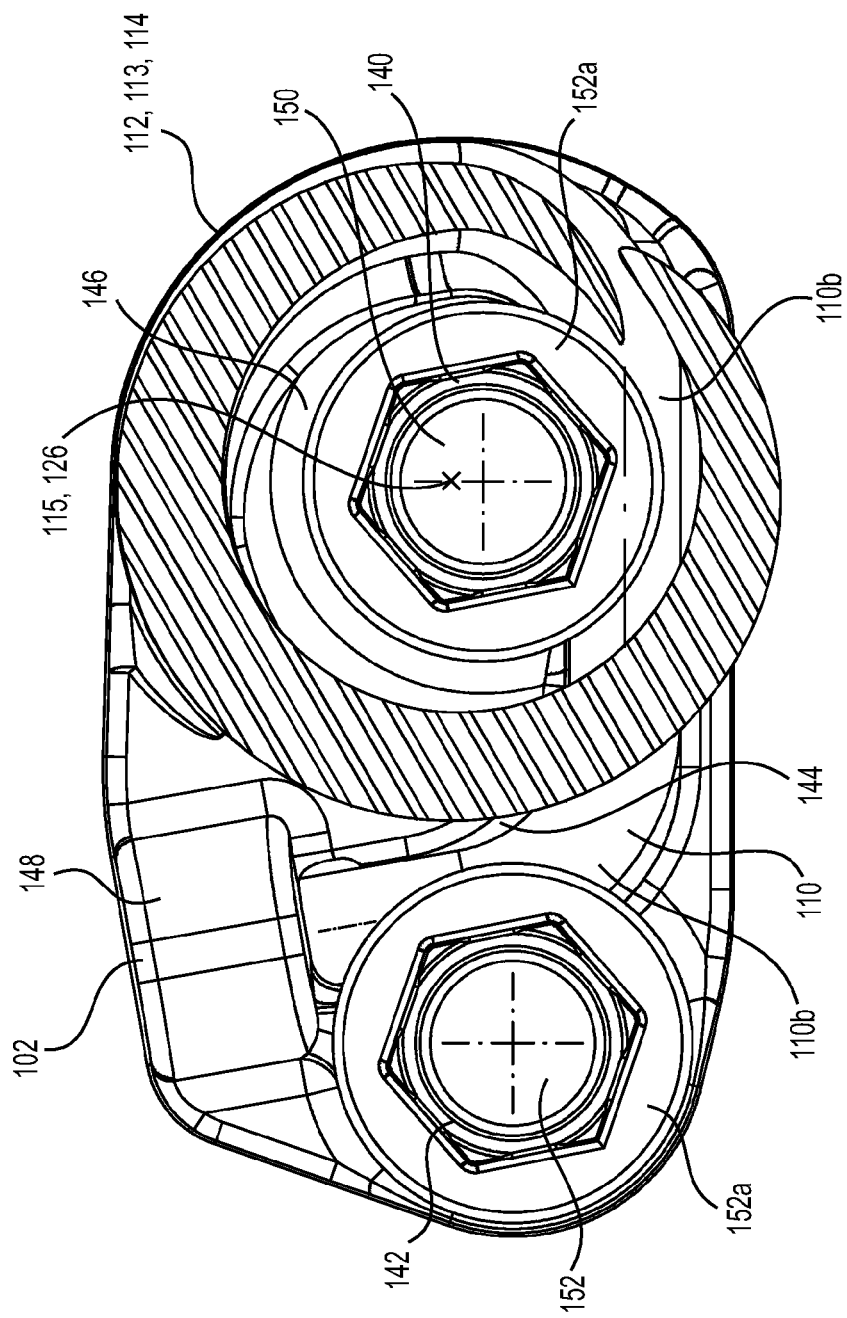
FIG. 9 is a cross-sectional view of the ice scratcher and mounting bracket of FIG. 6 taken along the line B-B in FIG. 6.
Figure 10:
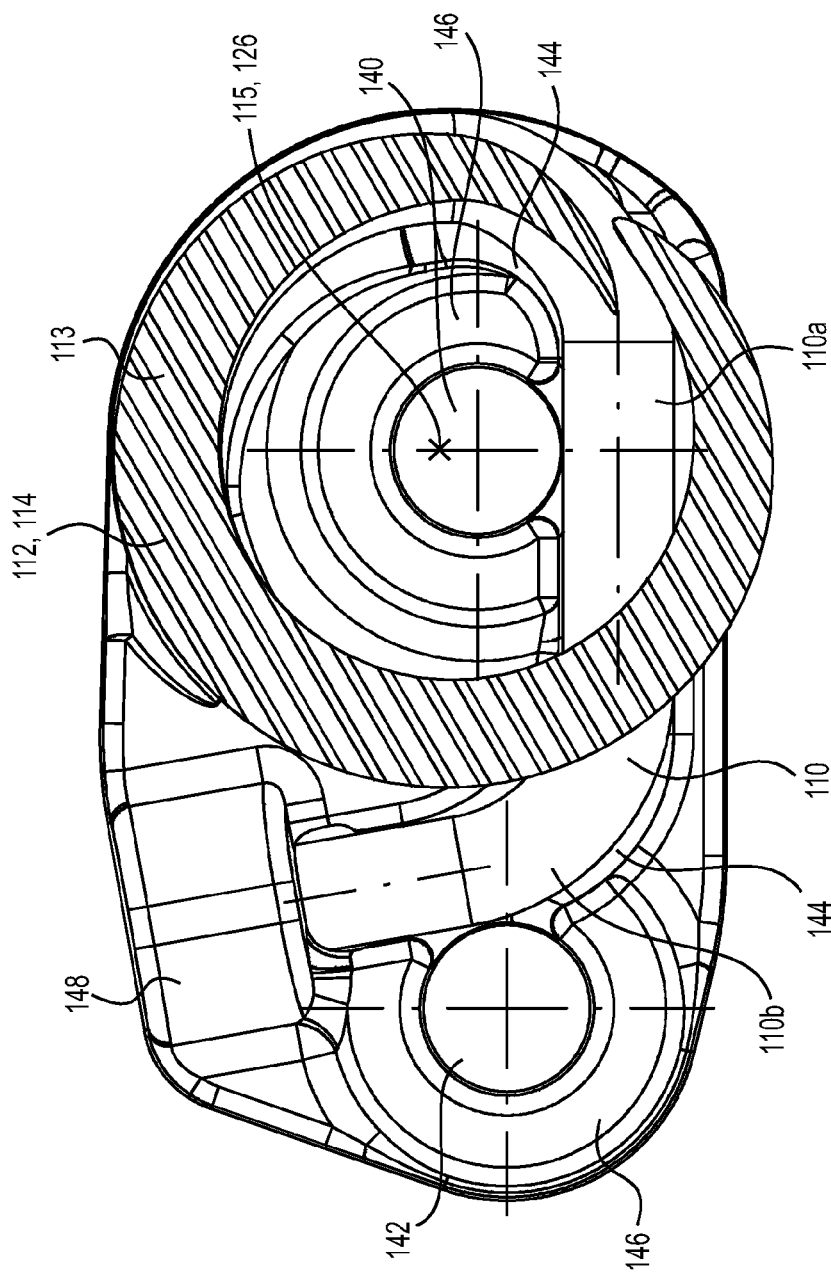
FIG. 10 is a cross-sectional view of the ice scratcher and mounting bracket of FIG. 6 taken along the line B-B in FIG. 6 with the bolts removed for clarity.

The ice scratcher 100 comprises an upper end portion 110, a spring 112, an elongate member 118 and a lower end portion 120. The ice scratcher 100 is fixed to the mounting bracket 102 by the upper ice scratcher end portion 110 as can be seen in FIGS. 5, 9 and 10. The spring 112 connects the upper ice scratcher end portion 110 to the elongate member 118. The elongate member 118 extends from the spring 112 to the lower ice scratcher end portion 120. The lower ice scratcher end portion 120 and the elongate member 118 contact the ice/snow surface 1 on which the snowmobile 10 is operating in order to create a spray of ice/snow (FIGS. 11, 12).

Figure 11:
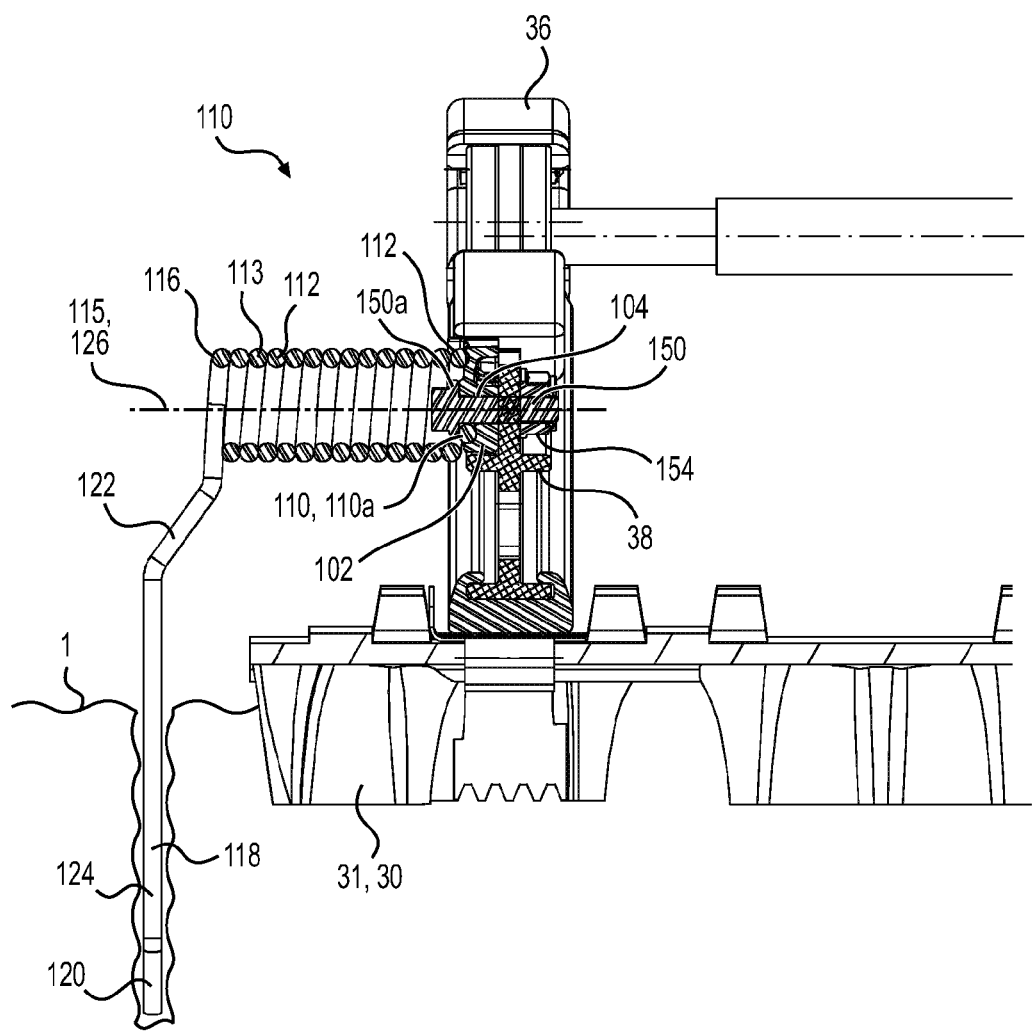
FIG. 11 is a cross-sectional view of the ice scratcher, left slide rail and endless track of FIG. 4 taken along the line A-A of FIG. 4, with the ice scratcher shown in an unbent configuration.
Figure 12:
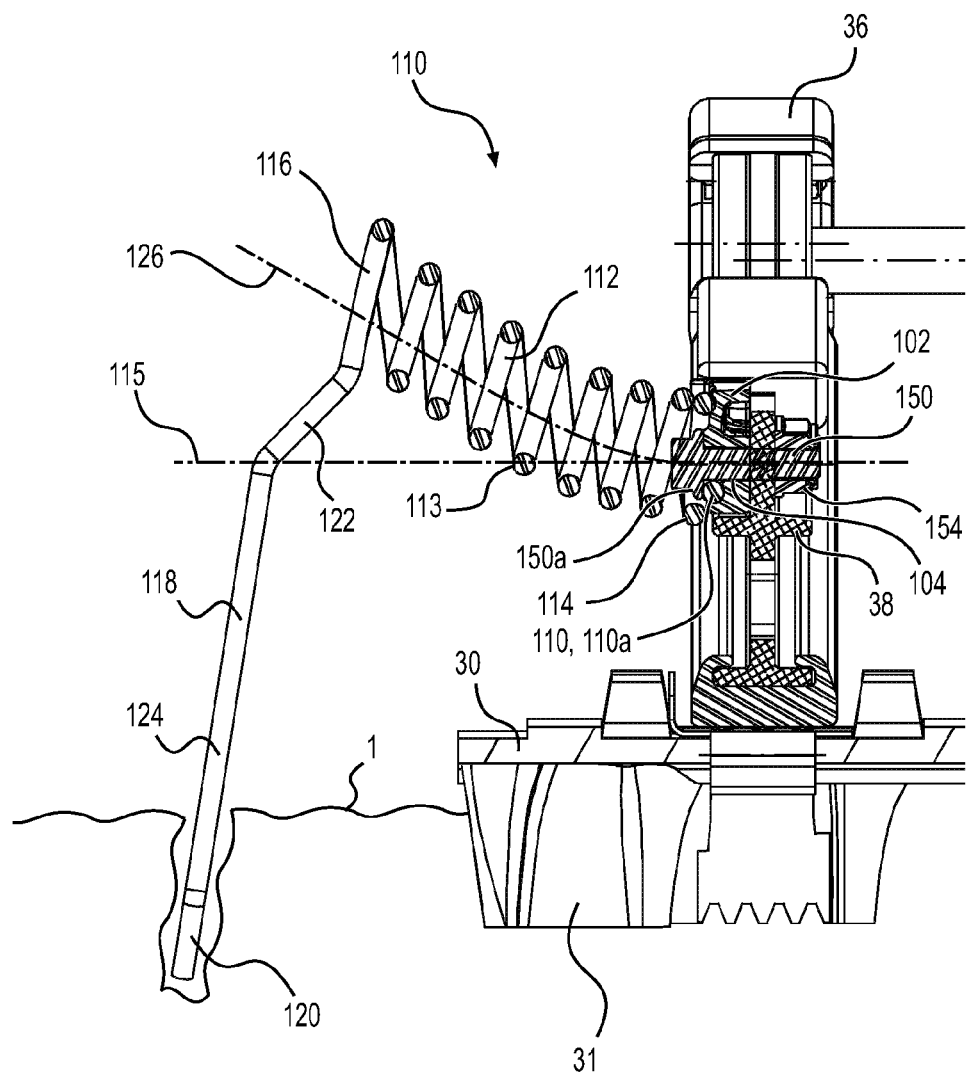
FIG. 12 is a cross-sectional view of the ice scratcher, left slide rail and endless track of FIG. 4 taken along the line A-A of FIG. 4, with the ice scratcher shown in a bent configuration.
Figure 13:
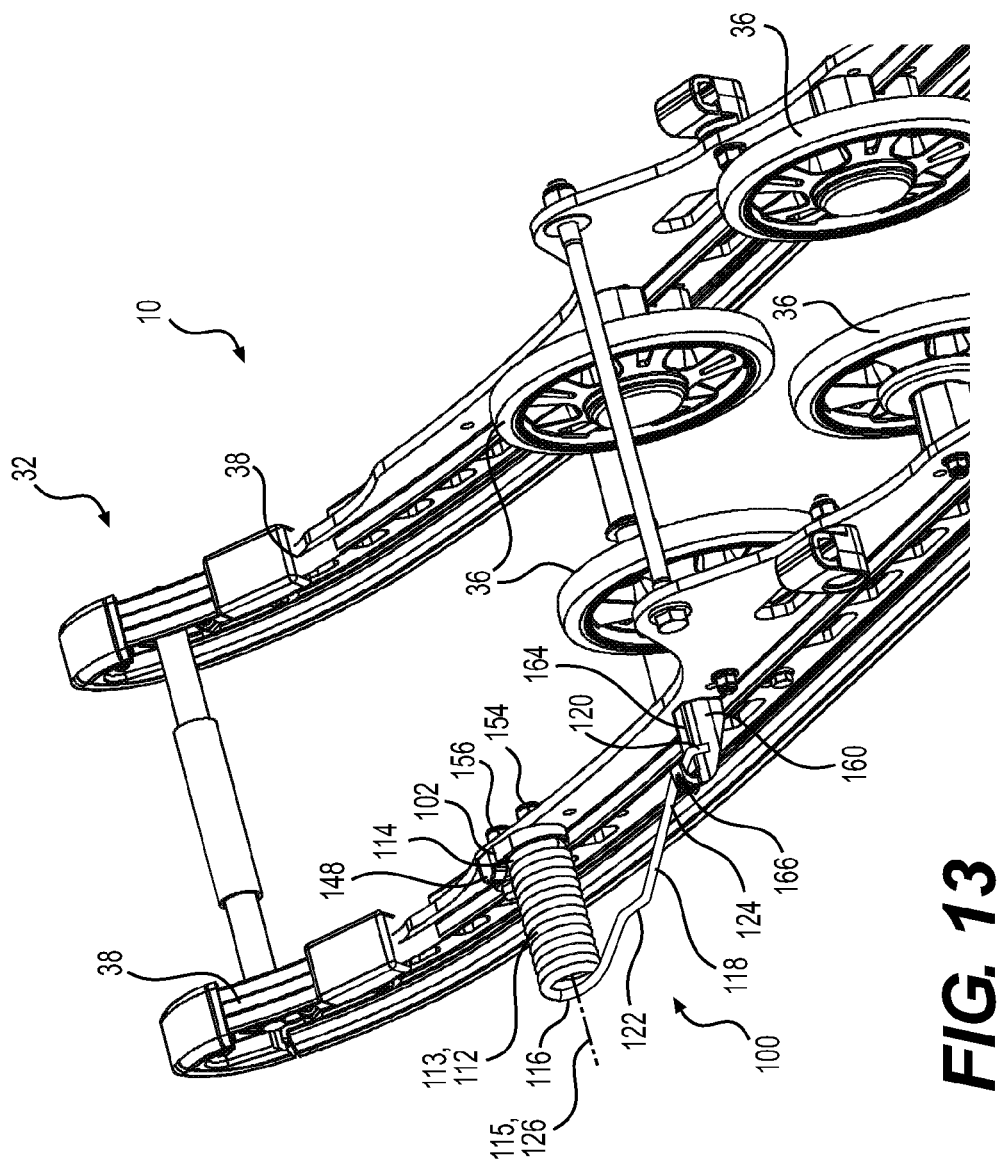
FIG. 13 is a perspective view, taken from a top, rear and left side, of a portion of the slide rail of FIG. 2 having the ice scratcher mounted thereon and shown in a stowed configuration.

It should be noted that in FIGS. 1 to 7D and 11, the ice scratcher 100 is shown in an unbent configuration, such as when the snowmobile 10 is at rest on very soft snow, or with the track 30 lifted above the ground. When the snowmobile 10 operates on ice or hard packed snow, the ice scratcher 100 is in a bent configuration wherein the lower end portion 120 of the ice scratcher 100 is closer to the slide rail 38 in the vertical direction as seen in FIG. 12. In FIG. 12, the lower end portion 120 is also displaced laterally farther away from the slide rail 38 compared to its position in FIG. 11. It is however contemplated that, in some bent configurations, the lower end portion 120 could not be laterally displaced with respect to its position in an unbent configuration as shown in FIG. 11, or that the lateral direction displacement of the lower end portion 120 could be less than that shown in FIG. 12. The ice scratcher 100 can also be disposed in a stowed configuration as shown in FIG. 13. When in the stowed configuration, the ice scratcher 100 does not scratch the surface 1 on which the snowmobile 10 operates.

The spring 112 extends leftwardly from the mounting bracket 102. The spring has a right side 114 connected to the upper ice scratcher end portion 110 and a left side 116 connected to the elongate member 118. The left side 116 is disposed laterally outwardly of the track 30. The spring 112 has a plurality of circular coils 113 extending between its right and left ends 114, 116. When viewed from the left side of the snowmobile 10, the coils 113 are wound in a clockwise direction from the elongate member 118 to the upper ice scratcher end portion 110.

In the unbent configuration of the illustrated implementation of the ice scratcher 100, the left end 116 of the spring 112 is vertically aligned with the right end 114. A line 126 passing through the centers of the circular coils 113 of the spring 112 is referred to herein as the center line 126 as best seen in FIGS. 11 and 12. In the unbent configuration of FIG. 11, the center line 126 forms a straight line, referred to herein as the unbent configuration coil axis 115 or the coil axis 115. The coil axis 115 is thus a laterally extending straight line.

The elongate member 118 has an upper portion 122 connected to the left side of the spring 112 and a lower portion 124 connected to the lower ice scratcher end portion 120. The upper portion 122 extends downwardly and leftwardly from the left end 114 of the spring 112 in the unbent configuration. The elongate member 118 extends downwardly between the upper portion 122 and the lower ice scratcher end portion 120. It is contemplated that the elongate member 118 could extend downwardly and leftwardly along its entire length, or that the lower portion 124 could extend downwardly and leftwardly instead of the upper portion 122. It is contemplated that the portions 122, 124 of the elongate member 118 could be disposed at a different angle than as shown, or be curved.

In the illustrated implementation, in the unbent configuration, the entirety of the elongate member 118 is disposed at the same longitudinal position and forward of the coil axis 115. It is however contemplated that the elongate member 118 could be longitudinally aligned with the coil axis 115 or disposed rearward thereof. It is also contemplated that the elongate member 118 could extend forwardly or rearwardly in the unbent configuration.

The lower ice scratcher end portion 120 extends downwardly and forwardly from the lower end 124 of the elongate member 118 in the unbent configuration of the ice scratcher 100. The lower ice scratcher end portion 120 extends forwardly at an obtuse angle with respect to elongate member 118 which helps to break through the ice/snow when the snowmobile 10 is moving in a forward direction, and to skip over obstacles such as rocks when moving in a rearward direction. It is contemplated that the lower ice scratcher end portion 120 could extend downwardly but not forwardly in the unbent configuration. It is also contemplated that the lower ice scratcher end portion 120 could extend downwardly and rearwardly from the elongate member 118. It is contemplated that the lower ice scratcher end portion 120 could be shaped differently than as shown. It is contemplated that the lower ice scratcher end portion 120 could have a different cross-sectional shape (in a horizontal plane) than the elongate member 118.

Figure 4:
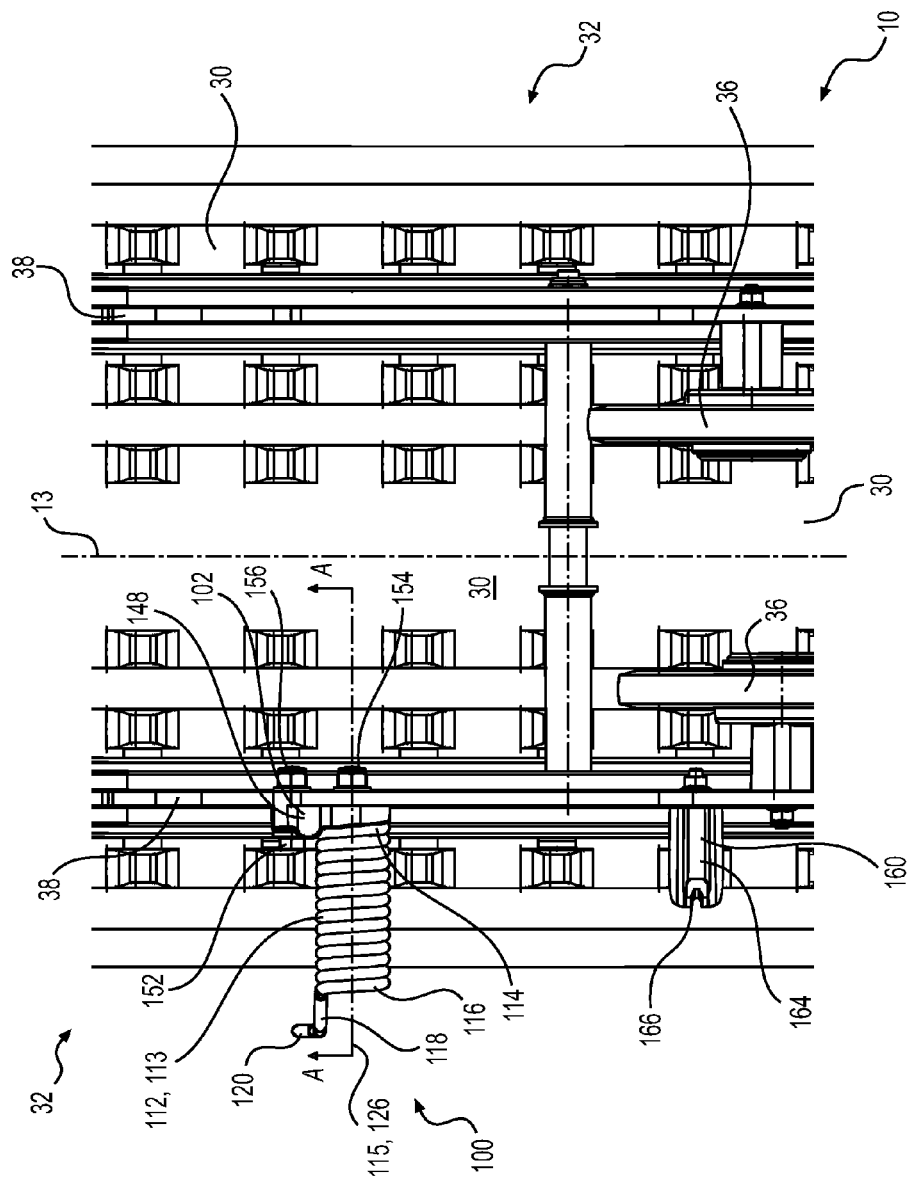
FIG. 4 is a top plan view of the ice scratcher and slide rail assembly of FIG. 2 positioned on the endless drive track of the snowmobile of FIG. 1.

As can be seen best in FIG. 4, the left end 116 of the spring 112, the entire elongate member 118 and the lower ice scratcher end portion 120 extend laterally outside the track 30.

As best seen in FIGS. 7A to 7D, 9 and 10, the upper ice scratcher end portion 10 has a portion 110a connected to the coil 113 of the right end 114 of the spring 112 and a portion 110b connected to the portion 110a. The portion 110b extends forwardly and upwardly from the portion 110a. The portion 110a is disposed radially inwardly of the coils 113 with respect to the unbent configuration coil axis 115 when viewed from the left side. The portion 110b is disposed radially outwardly of the coils 113 with respect to the unbent configuration coil axis 115 when viewed from the left side. It is contemplated that the portion 110b could not extend upwardly from the portion 110a. It is contemplated that the portion 110b could extend rearwardly from the portion 110a. It is contemplated that the portion 110b could be longer or shorter than as shown. It is contemplated that the portion 110b could be shaped differently than as shown. For example, the portion 110b radially outside the coils 113 could form a loop, or even have a planar shape.

The ice scratcher 100 of the illustrated implementation is constructed from a solid metal rod bent to form the upper end portion 110, the spring 112, the elongate member 118 and the lower end portion 120. Although, in the illustrated implementation, the upper end portion 110, the spring 112, the elongate member 118 and the lower end portion 120 are all formed integrally with one another, it is contemplated that they could not be formed integrally. For example, the upper ice scratcher end portion 110 could be formed separately and welded to the spring 112. As another example, the elongate member 118 and/or the lower ice scratcher end portion 120 could be detachably connected to the spring 112 so that it can be replaced if damaged or worn out. In the illustrated implementation, the metal rod forming the ice scratcher 100 has a uniform circular cross-section with a uniform thickness 130 along the entire length of the ice scratcher 100 between the end portions 110, 120. It is contemplated that the cross-sectional shape of the ice scratcher 100 could be other than circular and could be non-uniform. It is contemplated that the ice scratcher thickness 130 could not be uniform.

The mounting bracket 102 will now be described with reference to FIGS. 5 to 7B and 8 to 12.

The left mounting bracket 102 has two apertures 140 and 142. The aperture 142 is disposed forward of the aperture 140 when the mounting bracket 102 is attached to the slide rail 38. The forward aperture 142 is smaller than the rearward aperture 140 but it is contemplated that the relative sizes of the apertures 140, 142 could be different than as shown. The apertures 140, 142 are aligned with corresponding apertures of the slide rail 38 (with only the rearward aperture 104 corresponding to the rearward aperture 140 being shown in FIGS. 11 and 12). The center of the forward aperture 142 is disposed higher than the center of the rearward aperture 140 when attached to the slide rail 38 as shown but it is contemplated that the apertures 140, 142 could be aligned vertically or that the center of the forward aperture 140 could be disposed lower than the center of the rearward aperture 140. The center of the rearward aperture 140 is longitudinally aligned (FIG. 7A) with and vertically lower (FIG. 7B) than the coil axis 115 of the spring 112 when the ice scratcher 100 is attached thereto. The apertures 140, 142 are each smaller than the inner diameter of the coils 113. The center of the aperture 140 is disposed within the coils 13 in a radial direction with respect to the coil axis 115. In other words, the center of the aperture 140 is radially spaced from the coil axis 115 by a distance less than a coil radius. The aperture 140 is entirely disposed within the coils 13 in a radial direction with respect to the coil axis 115. The center of the aperture 142 is disposed outside the coils 13 in a radial direction with respect to the coil axis 115, i.e., the center of the aperture 142 is radially spaced from the coil axis 115 by a distance greater than a coil radius. The aperture 142 is entirely disposed outside the coils 13 in a radial direction with respect to the coil axis 115.

A groove 144 extends partly around the rearward aperture 140. The groove 144 is shaped to receive the upper ice scratcher end portion 110 and a part of the coil 113 at the right end 114 of the spring 112. The groove 144 extends above, behind, below and forward of the rearward aperture 140. The groove 144 extends upwards between the rearward aperture 140 and the forward aperture 142 from below the rearward aperture 140. The right end coil 113 of the spring 112 is received in the portion of the groove 144 above and behind the rearward aperture 140. The upper ice scratcher end portion 110 is received in the portions of the groove 144 below and forward of the rearward aperture 140.

Figure 8:
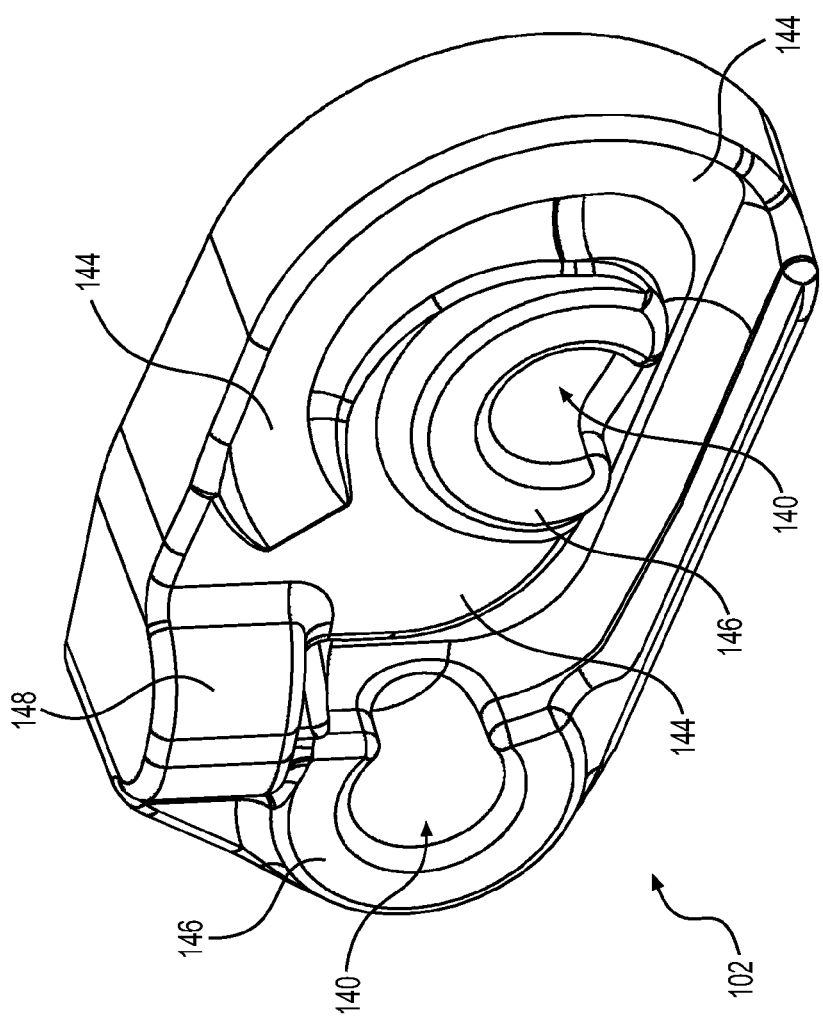
FIG. 8 is a perspective view taken from a rear, left side of the mounting bracket of FIG. 6.

A rim 146 partly surrounds each aperture 140, 142 as best seen in FIG. 7. As seen in FIG. 8, the groove 144 overlaps with the lower portion of the rearward aperture 140 and the rear portion of the forward aperture 142. The apertures 140, 142 therefore do not have a rim 146 in these portions which overlap with the groove 144.

A projection 148 of the mounting bracket extends above aperture 142. The end of the portion 110b abuts against the projection 148 when the upper ice scratcher end portion 110 is received in the groove 144.

The mounting bracket 102 is placed over the left side surface of the slide rail 38. A bolt 150 is inserted from the left side of the mounting bracket 102 through the spring 112, the rearward mounting bracket aperture 140 and the corresponding slide rail aperture 104. A nut 154 engages the threaded end portion of the bolt 150 extending on the right side of the left slide rail 38. The bolt 150 has a bolt head 150a. The upper ice scratcher end portion 110a is held between bolt head 150a and the groove surface. The bolt 150 thus fastens the ice scratcher 100 to the mounting bracket 102 and the slide rail 38.

A bolt 152 is inserted from the left side of the mounting bracket 102 through the spring 112, the forward mounting bracket aperture 142 and the corresponding slide rail aperture (not shown). A nut 156 engages the threaded end portion of the bolt 152 extending on the right side of the left slide rail 38. The bolt 152 has a bolt head 152a. The portion 110b of the upper end portion 110 is held between the bolt head 152a and the groove surface. The bolt 152 thus fastens ice scratcher 100 to the mounting bracket 102 and the slide rail 38.

The non-circular shape of the upper ice scratcher end portion 110 and the complementary shape of the groove 144 helps to align the ice scratcher 100 for assembly on the slide rail 38. The shape of the upper ice scratcher end portion 110 and the groove 144 also helps to prevent pivoting of the upper ice scratcher end portion 110 with respect to the coil axis 115 when the lower ice scratcher end portion 120 is scratching or digging into the surface 1 that the snowmobile 10 is operating on (FIG. 11, 12).

In the illustrated implementation, the mounting bracket 102 and the slide rail 38 are fastened together at the same location and by the same fastener (bolts 150, 152 and the nuts 154, 156) as the mounting bracket 102 and the ice scratcher 100. This minimizes the number of parts required for assembly of the ice scratcher 100 on the snowmobile 10 and enhances the cost, ease and efficiency of assembly. It is however contemplated that the mounting bracket 102 could be fastened to the slide rail 38 by a different fastener and/or at a different location. It is contemplated that the mounting bracket 102 could be omitted and that the ice scratcher 100 could be directly connected to the slide rail 38. It is contemplated that the ice scratcher 100 could be fastened to the slide rail 38 by a mounting bracket that is different than the mounting bracket 102 shown in the figures.

In the illustrated implementation, the spring 112 has a stiffness such that the spring 112 remains in an unbent configuration when the right side 112 is connected to the mounting bracket 102 and slide rail 38 and with the right end 116 supporting the weight of the elongate member 118 and lower ice scratcher end portion 120 suspended therefrom. However the spring 112 has a stiffness that allows the spring 112 to bend when the lower ice scratcher end portion contacts the ice/snow 1 on which the snowmobile 10 is operating.

In the bent configuration, as can be seen in FIG. 12, the center line 126 is bent upwards with respect to the coil axis 115. The left end 116 of the spring 112 is disposed higher than the right end 114. Since the right end of the spring 112 is fixed to the mounting bracket 102, the right end of the centerline 126 coincides with the coil axis 115. It is contemplated that a right portion of the center line 126 adjacent to the mounting bracket 102 could be disposed along the coil axis 115 for small bending forces but not the entirety thereof. In general the center line 126 is curved in at least one location in the bent configuration of the ice scratcher 100. The amount of bending of the spring 112 depends on factors such as the hardness of the surface, the speed of motion, the direction of motion, the stiffness of the spring coils 113, and the like, as will be discussed below.

The bending of the spring 112 biases the lower ice scratcher end portion 120 against the surface 1 enabling scratching of the surface 1. The bending of the spring 112 helps to prevent damage to the elongate member 118 and the lower ice scratcher end portion 120 when they dig into hard surfaces 1 and especially when the snowmobile 10 is moving in a rearward direction. The bending of the spring 112 also helps to absorb shocks applied to the lower ice scratcher end portion 120 caused by uneven terrain or obstacles, such as rocks, regardless of the direction in which the snowmobile 10 is moving. The bending of the spring 112 also allows for some lateral movement of the lower ice scratcher end portion 120.

For a given spring stiffness, the greater the spring length 134 (FIG. 7B), the more bendable the spring 112. A spring length 134 can be defined in a direction parallel to the coil axis 115 with the spring 112 in an unbent configuration. In the illustrated implementation, the spring length 134 is less than the length of the elongate member 118.

With reference to FIGS. 11 and 12, the ice scratcher 100 is in an operative configuration when the lower ice scratcher end portion 120 is in contact with the ground 1 on which the snowmobile 10 is operating in order to create a spray of ice or snow.

On soft snow surfaces which do not offer much resistance, the ice scratcher 100 is in an operative and unbent configuration as shown in FIG. 11 as the snowmobile 10 moves slowly along the soft surface 10 in a forward or rearward direction. The lower portion 124 of the elongate member 118 is also contacting the ground 1 in addition to the lower ice scratcher end portion 120.

On hard surfaces 1, such as densely packed snow or ice, which offer considerable resistance to the ice scratcher 100, the ice scratcher 100 is in an operative and bent configuration. On hard surfaces 1, the ice scratcher 100 gets bent such that the lower ice scratcher end portion 120 is vertically closer to the surface 1 and the spring 112 is uncoiled or coiled tighter than when in the unbent configuration of FIG. 11. Depending on the amount of bending of the spring 112, the lateral and longitudinal displacement of the lower ice scratcher end portion 120 and the direction of motion of the snowmobile 10, the lower portion 124 of the elongate member 118 may not be in contact with the ground 1, or only a small part thereof may be in contact with the ground 1. When the spring 112 bends upwards, the elongate member 118 may remain vertical, or tilt laterally outwardly as shown in FIG. 12.

When the snowmobile 10 is moving in a forward direction, the ground 1 exerts a rearward force on the lower ice scratcher end portion 120 and the elongate member 118 resulting in their rearward displacement. The rearward force on the elongate member 118 results in a counter-clockwise torque about the coil axis 115 on the left side 116 of the spring 112 when viewed from the left side, due to which the spring 112 tends to wind tighter. The biasing force of the spring 112 wound tighter helps the elongate member 118 and the lower ice scratcher end portion 120 to break through the ground 1 to create a spray of ice/snow. The lower ice scratcher portions 120, 124 are displaced rearwards with respect to the respect to the upper portion 122. The ice/snow also exerts an upward force on the elongate member 118 causing the spring 112 to bend upwards.

When the snowmobile 10 is moving in a reverse or rearward direction, the ground 1 exerts a forwardly directed force on the lower ice scratcher end portion 120 and the elongate member 118 and thereby a clockwise direction torque about the coil axis 115 (when viewed from the left side) on the left end 116 of the spring 112, i.e. in a direction to unwind the spring 112. The lower ice scratcher end portion 120 and the lower portion 124 of the elongate member 118 are displaced forwardly with respect to the upper portion 122. The spring 112 also bends upwards as shown in FIG. 12 due to the unwinding of the spring 112 and the upward force exerted thereon by the ground 1 via the elongate member 118. A harder surface 1, such as packed snow or ice, bends the spring 112 upwards more than a softer surface 1, such as loose snow.

When the direction of motion of the snowmobile 10 changes from a forward to a rearward direction, the ice scratcher portions 120, 124 move from a position rearward of the upper portion 122 to a position forward of the upper portion 122. The spring 112 also bends upwards, as shown in FIG. 12, as the ice scratcher portions 120, 124 move from a position disposed forward of the upper portion 122 to a position disposed rearward of the upper portion 122, and vice versa. The elongate member 118 may remain vertical, tilt laterally outwardly by a smaller amount than as shown in FIG. 12.

With reference to FIG. 13, the ice scratcher 100 can be placed in a stowed configuration where the lower ice scratcher end 206 is spaced from the surface 1 on which the snowmobile 10 operates. The snowmobile 10 is provided with a hook 160 to hold the lower ice scratcher end portion 120 spaced from the surface 1. The hook 160 extends leftwardly from the left slide rail 38. The hook 160 is disposed rearward of the mounting bracket 102.

To move the ice scratcher 100 to the stowed configuration, the elongate member 118 is pivoted rearwardly and rightwardly and then released when the lower ice scratcher end portion 120 is slightly above the hook 160. The upper surface 164 of the hook 160 supports the lower ice scratcher end portion 120 and the elongate member 118. The spring 112 biases the lower ice scratcher end portion 120 and the elongate member 118 against the upper surface 164 of the hook 160. A left portion 166 of the hook 160 extending upwards from the left side of the upper surface 164 prevents the lower ice scratcher end portion 120 from sliding laterally out of the hook 160. The hook 160 is disposed at a longitudinal and vertical position such that the upper surface 164 of the hook 160 contacts the ice scratcher 100 in the angled region where the elongate member 118 connects to the lower ice scratcher end portion 120. The lower ice scratcher end portion 120 thus extends downward and rearward from the hook 160. The leftwardly extending hook 160 reduces the amount by which the ice scratcher 100 is pushed laterally inwards to be stowed compared to the situation where the ice scratcher is stowed against the slide rail 38. It is contemplated that the hook 160 could be disposed further forward than as shown. It is contemplated that the hook 160 could be omitted and the ice scratcher 100 could be attached directly to a portion of the snowmobile 10. It is contemplated that the lower ice scratcher end portion 120 and/or the elongate member 118 could be fastened to the slide rail 38 or another portion of the snowmobile 10 by a clasp, clamp, band or other type of fastener. It is also contemplated that the ice scratcher 100 could be removed from the snowmobile 10 when it is not in use. The ice scratcher 100 could be disassembled from the mounting bracket 102 and/or the mounting bracket 102 could be disassembled from the snowmobile 10 when the ice scratcher is not in use.

To move the ice scratcher 100 back to the operative position, the elongate member 118 is moved upwardly and rightwardly to disengage from the hook 160, then leftwardly and released. Once released, the lower ice scratcher end portion 120 and the elongate member 118 pivot downwards in a clockwise direction to make contact with the surface 1.

Figure 14:
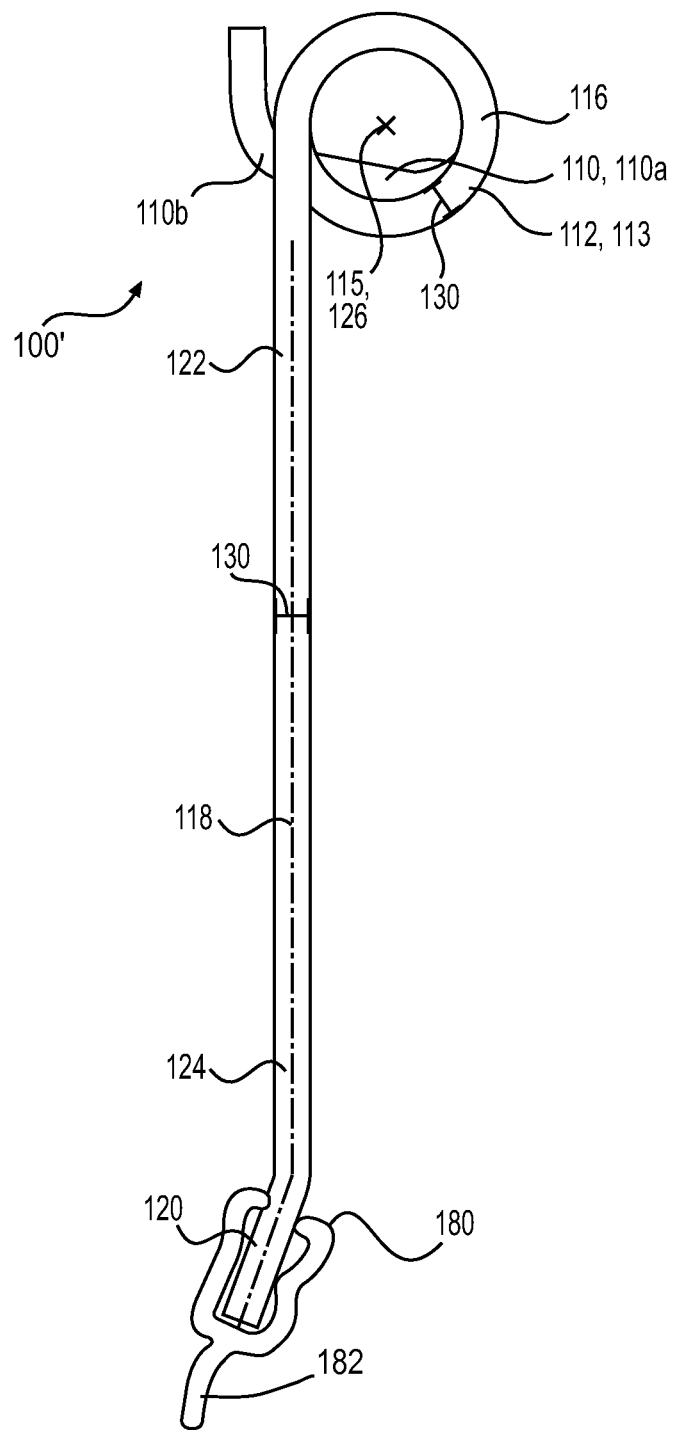
FIG. 14 is a left side elevation view of another implementation of an ice scratcher.

FIG. 14 shows another implementation of an ice scratcher 100'. The ice scratcher 100' shown in FIG. 14 is similar to the ice scratcher 100 of FIGS. 2 to 13. Features of the ice scratcher 100' of FIG. 14 that are similar to the ice scratcher 100 of FIGS. 2 to 13 have been labelled with the same reference numbers and will not be described again herein. The ice scratcher 100' has a wear-resistant tip 180 connected to the lower ice scratcher end portion 120. The tip 180 extends along a front and rear surface of the lower ice scratcher end portion 120 and also has a portion 182 extending downwardly and forwardly therefrom. It is contemplated that the lower ice scratcher end portion 120, or a portion thereof, could be entirely enclosed by the tip 180. The tip 180 is made of a hard material to prevent wearing by the ice/snow surface 1 engaged by the tip 180. In the illustrated implementation, the wear-resistant tip 180 is made of carbide but it is contemplated that the wear-resistant tip 180 could be made of any suitably hard material. It is contemplated that the tip 180 could be shaped differently, and/or connected differently, than as shown herein. It is contemplated that the portion 182 extending downwardly from the lower ice scratcher end portion 120 could be omitted, or be shaped differently than as shown herein. The tip 180 shown in FIG. 14 is formed separately from the lower ice scratcher end portion 120 and attached thereto. It is also contemplated that the lower ice scratcher end portion 120, or a portion thereof, could be coated or formed with an external layer of wear-resistance material, such as carbide and the like, to prevent wearing by the ice/snow surface 1 as the lower ice scratcher end portion 120 engages the surface 1.

The ice scratcher 100 or 100' could be provided in the form of a kit for assembling the ice scratcher 100, 100' on the snowmobile 10. The ice scratcher kit could include the ice scratcher 100 or 100', a mounting bracket such as the mounting bracket 102, and one or more fasteners such as the bolts 150, 152, and nuts 154, 156. The ice scratcher kit could also include the hook 160.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. An ice scratcher for attachment to a snowmobile comprising:
    a first ice scratcher end portion adapted for attachment to the snowmobile;
    a second ice scratcher end portion opposite the first ice scratcher end portion;
    an elongate member connected to the second ice scratcher end portion; and
    a spring connecting the first ice scratcher end portion to the elongate member, the spring comprising a plurality of coils defining an inner coil radius,
    the spring, when attached to the snowmobile by the first ice scratcher end portion, being movable between an unbent configuration wherein a centerline passing through respective centers of each coil of the plurality of coils defines an unbent configuration coil axis and a bent configuration wherein at least a portion of the centerline is displaced from the unbent configuration coil axis, at least a portion of the first ice scratcher end portion being radially spaced from the unbent configuration coil axis by a distance less than the inner coil radius when attached to the snowmobile.

2. The ice scratcher of claim 1, wherein a portion of the first ice scratcher end portion is radially spaced from the unbent configuration coil axis by a distance greater than the inner coil radius.

3. The ice scratcher of claim 1, wherein, in the unbent configuration, the second ice scratcher end portion extends downwardly and forwardly from the elongate member when the ice scratcher is attached to the snowmobile.

4. The ice scratcher of claim 1, wherein, in the unbent configuration, the elongate member is disposed forwardly of the unbent configuration coil axis when the ice scratcher is attached to the snowmobile.

5. The ice scratcher of claim 1, wherein, in the unbent configuration, an upper portion of the elongate member extends away from the spring in a direction parallel to the unbent configuration coil axis.

6. The ice scratcher of claim 1, wherein the spring is wound in a direction such that when the ice scratcher is attached to the snowmobile, a rearward displacement of the elongate member winds the spring tighter.

7. The ice scratcher of claim 1, wherein a length of the spring in a direction parallel to the unbent configuration coil axis is smaller than a length of the elongate member.

8. The ice scratcher of claim 1, wherein the elongate member is integrally formed with the spring.

9. The ice scratcher of claim 1, wherein the second ice scratcher end portion is integrally formed with the elongate member.

10. The ice scratcher of claim 1, further comprising a wear-resistant tip connected to the second ice scratcher end portion.

11. An ice scratcher assembly comprising:
    an ice scratcher according to claim 1; and
    a mounting bracket adapted for attachment to the snowmobile, the first ice scratcher end portion being fixed to the mounting bracket.

12. The ice scratcher assembly of claim 11, wherein the first ice scratcher end portion is detachably fastened to the mounting bracket.

13. The ice scratcher assembly of claim 11, wherein the mounting bracket comprises a first aperture, a center of the first aperture being radially spaced from the unbent configuration coil axis by a distance less than the inner coil radius, and further comprising a first threaded fastener inserted through the first aperture and fastening a first portion of the first ice scratcher end portion to the mounting bracket.

14. The ice scratcher assembly of claim 13, wherein the mounting bracket comprises a groove, the first portion of the first ice scratcher end portion being at least in part received in the groove.

15. The ice scratcher assembly of claim 13, wherein the mounting bracket comprises a second aperture, a center of the second aperture being radially spaced from the unbent configuration coil axis by a distance greater than the inner coil radius, and further comprising a second threaded fastener inserted through the second aperture and fastening a second portion of the first ice scratcher end portion to the mounting bracket.

16. The ice scratcher assembly of claim 11, further comprising a hook adapted for attachment to the snowmobile, the ice scratcher having a stowed configuration when attached to the snowmobile wherein at least one of the elongate member and the second ice scratcher end portion is supported by the hook.

17. A snowmobile comprising:
    a frame including a tunnel;
    a motor connected to the frame;
    a suspension assembly connected to the frame;
    an endless track connected to the frame via the suspension assembly and operatively connected to the motor; and an ice scratcher according to claim 1, the first ice scratcher end portion being connected to at least one of the frame and the suspension assembly, the unbent configuration coil axis extending laterally, the ice scratcher having an operative configuration wherein the second ice scratcher end portion is in contact with a surface on which the snowmobile operates at a position laterally outward of the track.

18. The snowmobile of claim 17, wherein the suspension assembly comprises a slide rail contacting an inner surface of the track, the ice scratcher being attached to the slide rail.

19. The snowmobile of claim 17, wherein the ice scratcher has a stowed configuration wherein the second ice scratcher end portion is spaced from the surface on which the snowmobile operates.

20. The snowmobile of claim 19, wherein the second ice scratcher end portion is disposed rearward of the spring in the stowed configuration.

21. The snowmobile of claim 19, wherein, when viewed from a side of the snowmobile:

the plurality of coils is wound in one of a clockwise and a counter-clockwise direction with the ice scratcher in the unbent configuration; and the second ice scratcher end portion is displaced in the one of the clockwise and the counter-clockwise directions to move the ice scratcher from the operative configuration to the stowed configuration.

22. The snowmobile of claim 19, wherein the suspension assembly comprises a slide rail contacting an inner surface of the track;

the snowmobile further comprising a hook attached to the slide rail, the hook extending laterally outwardly from the slide rail and selectively supporting at least one of the elongate member and the second ice scratcher end portion when the ice scratcher is in a stowed configuration.

23. An ice scratcher kit for providing an ice scratcher assembly on a snowmobile, the kit comprising:

an ice scratcher according to claim 1;

a mounting bracket adapted to be fastened to the snowmobile; and at least one fastener adapted to fasten the ice scratcher to the mounting bracket.

24. The ice scratcher kit of claim 23, wherein the at least one fastener is further adapted to fasten the mounting bracket to the snowmobile.

\* \* \* \* \*